(12) United States Patent
Jiang

(10) Patent No.: US 11,126,034 B2
(45) Date of Patent: Sep. 21, 2021

(54) UNDER-SCREEN OPTICAL FINGERPRINT RECOGNITION SYSTEM, BACKLIGHT MODULE, DISPLAY SCREEN, AND ELECTRONIC DEVICE

(71) Applicant: SHENZHEN GOODIX TECHNOLOGY CO., LTD., Shenzhen (CN)

(72) Inventor: Fanglin Jiang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 114 days.

(21) Appl. No.: 16/601,625

(22) Filed: Oct. 15, 2019

(65) Prior Publication Data

US 2020/0057340 A1 Feb. 20, 2020

Related U.S. Application Data

(63) Continuation of application No. PCT/CN2018/100665, filed on Aug. 15, 2018.

(51) Int. Cl.
*G06K 9/00* (2006.01)
*G02F 1/13357* (2006.01)

(52) U.S. Cl.
CPC .. *G02F 1/133606* (2013.01); *G02F 1/133605* (2013.01); *G06K 9/0004* (2013.01)

(58) Field of Classification Search
CPC ............ G06K 9/0004; G02F 1/133605; G02F 1/133606
See application file for complete search history.

(56) References Cited

U.S. PATENT DOCUMENTS

2002/0101549 A1 8/2002 Katsu et al.
2005/0122308 A1 6/2005 Bell et al.
(Continued)

FOREIGN PATENT DOCUMENTS

CN 102541362 A 7/2012
CN 104463107 A 3/2015
(Continued)

OTHER PUBLICATIONS

Chung-Feng Chen et al. "High throughput reflective light guide for planar illuminator", Applied Optics, vol. 47, No. 6, Feb. 20, 2008 (Feb. 20, 2008), pp. 784-791, XP001511637.
(Continued)

*Primary Examiner* — Yuzhen Shen
(74) *Attorney, Agent, or Firm* — Brion Raffoul

(57) ABSTRACT

An under-screen optical fingerprint recognition system, a backlight module, a display screen, and an electronic device are provided. The under-screen optical fingerprint recognition system is applied to a display screen with a backlight module, the under-screen optical fingerprint recognition system includes a fingerprint recognition chip and a first light source, the wavelength of fingerprint detecting light emitted by the first light source is within a preset wavelength range, the fingerprint recognition chip is arranged below the backlight module for receiving light carrying fingerprint information that passes through the backlight module and has a diffusivity smaller than or equal to a set threshold, and the light carrying fingerprint information is reflected by a finger from the light emitted by the first light source. The system may be applied to a display screen with a backlight module to meet the requirements of the LCD screen for under-screen fingerprint recognition.

17 Claims, 6 Drawing Sheets

(56) References Cited

U.S. PATENT DOCUMENTS

| | | |
|---|---|---|
| 2011/0007047 A1 | 1/2011 | Fujioka et al. |
| 2012/0127128 A1* | 5/2012 | Large .................... G06F 3/0425 345/175 |
| 2013/0335677 A1 | 12/2013 | You |
| 2015/0022648 A1 | 1/2015 | Kim et al. |
| 2016/0224816 A1 | 8/2016 | Smith et al. |
| 2017/0108672 A1 | 4/2017 | Chang et al. |
| 2017/0124376 A1 | 5/2017 | Wyrwas et al. |
| 2017/0153743 A1* | 6/2017 | Kim .................... G06K 9/00013 |
| 2017/0316248 A1 | 11/2017 | He et al. |
| 2017/0318239 A1 | 11/2017 | Miyasaka |
| 2018/0012069 A1 | 1/2018 | Chung et al. |
| 2018/0314096 A1 | 11/2018 | Yang et al. |
| 2019/0171050 A1* | 6/2019 | Chen .................... G02F 1/13338 |
| 2019/0346939 A1 | 11/2019 | Na et al. |
| 2020/0301207 A1 | 9/2020 | Yoshikawa et al. |
| 2020/0409218 A1 | 12/2020 | Tsai et al. |

FOREIGN PATENT DOCUMENTS

| | | |
|---|---|---|
| CN | 105117697 A | 12/2015 |
| CN | 105683993 A | 6/2016 |
| CN | 105807521 A | 7/2016 |
| CN | 106203408 A | 12/2016 |
| CN | 106233295 A | 12/2016 |
| CN | 106325479 A | 1/2017 |
| CN | 106326855 A | 1/2017 |
| CN | 106326855 A | 1/2017 |
| CN | 106372587 A | 2/2017 |
| CN | 106462756 A | 2/2017 |
| CN | 106773229 A | 5/2017 |
| CN | 106773229 A | 5/2017 |
| CN | 106845451 A | 6/2017 |
| CN | 106934384 A | 7/2017 |
| CN | 107103304 A | 8/2017 |
| CN | 107133581 A | 9/2017 |
| CN | 107170360 A | 9/2017 |
| CN | 107209304 A | 9/2017 |
| CN | 107209304 A | 9/2017 |
| CN | 107251046 A | 10/2017 |
| CN | 107256391 A | 10/2017 |
| CN | 107450839 A | 12/2017 |
| CN | 107545234 A | 1/2018 |
| CN | 107644202 A | 1/2018 |
| CN | 107767835 A | 3/2018 |
| CN | 107885361 A | 4/2018 |
| CN | 107885361 A | 4/2018 |
| CN | 207268815 U | 4/2018 |
| CN | 108196740 A | 6/2018 |
| CN | 108229241 A | 6/2018 |
| CN | 207601817 U | 7/2018 |
| CN | 109074492 A | 12/2018 |
| CN | 109863508 A | 6/2019 |
| EP | 3267359 A1 | 1/2018 |
| WO | 2005057399 A2 | 6/2005 |
| WO | 2005057399 A3 | 9/2005 |
| WO | WO201714664 A1 | 7/2017 |
| WO | 2018049944 A1 | 3/2018 |

OTHER PUBLICATIONS

Xi Wang, Goodix launches live fingerprint recognition chip to push mobile payment security to a new level, Communication World, Issue 8, Feb. 29, 2016, 3 pages.

Wenwei Ye et al, Design of Optical System for Multimode Recognition Based on Fingerprints and Veins, Laser & Optoelectronics Progress, vol. 55, Issue 9, May 1, 2018, 7 pages.

* cited by examiner

UNDER-SCREEN OPTICAL FINGERPRINT RECOGNITION SYSTEM, BACKLIGHT MODULE, DISPLAY SCREEN, AND ELECTRONIC DEVICE

CROSS-REFERENCE TO RELATED APPLICATIONS

The present application is a continuation of international application No. PCT/CN2018/100665, filed on Aug. 15, 2018, all of which is incorporated herein by reference in its entirety.

TECHNICAL FIELD

Embodiments of the present application relate to the technical field of sensor devices, and in particular, relate to an under-screen optical fingerprint recognition system, a backlight module, a display screen, and an electronic device.

BACKGROUND

As the technology is increasingly developed, information security receives more and more attention. Electronic devices such as mobile phones have generally realized the verification of user's authority by fingerprint recognition, thereby ensuring the information security. On the other hand, with the increasing demand for thinner electronic devices, in order to increase the screen-to-body ratio of an electronic device, a technical solution for disposing a fingerprint recognition module under an Organic Light-Emitting Diode (OLED) screen has appeared.

For the OLED screen, the fingerprint recognition module is arranged under the OLED screen. When used, fingerprint information may be transmitted by a transparent hole in the middle of each pixel of the OLED screen. Therefore, under-screen optical fingerprint may be easily applied to the OLED screen.

However, for some screens such as Liquid Crystal Display (LCD) screens, because their display principle is different from that of the OLED screen, each layer of functional film of a backlight module in the LCD screen has the effect of scattering, blurring or insulating light signals, and the fingerprint information of light fingerprint recognition is destroyed in the backlight module, resulting in poor accuracy of fingerprint recognition, so that under-screen fingerprint recognition cannot be effectively realized.

SUMMARY

In view of the above, one of the technical problems to be solved by the embodiments of the present application is to provide an under-screen optical fingerprint recognition system, a backlight module, a display screen, and an electronic device, which are used to overcome the problem of poor under-screen fingerprint recognition accuracy of an LCD screen in the related art.

According to a first aspect of the embodiments of the present application, an under-screen optical fingerprint recognition system is provided, applied to a display screen with a backlight module, where the under-screen optical fingerprint recognition system includes a fingerprint recognition chip and a first light source, the wavelength of fingerprint detecting light emitted by the first light source is within a preset wavelength range, the fingerprint recognition chip is arranged below the backlight module for receiving light carrying fingerprint information that passes through the backlight module and has a diffusivity smaller than or equal to a set threshold, and the light carrying fingerprint information is reflected by a finger from the light emitted by the first light source.

According to a second aspect of the embodiments of the present application, a backlight module is provided, including a reflecting portion, a light guiding portion and a diffusing portion arranged in sequence, where the reflecting portion is configured to allow the received light within a preset wavelength range to pass, and to reflect the received backlight beyond the preset wavelength range to the light guiding portion; the light guiding portion is located above the reflecting portion, and is provided with a backlight processing region and a fingerprint recognition region, the fingerprint recognition region being used to allow at least part of the light within the preset wavelength range to pass, and the backlight processing region being used to convert the received backlight into light emitted from a front side of the light guiding portion; and the diffusing portion is located above the light guiding portion, so that the diffusivity for at least part of the received light within the preset wavelength range is smaller than or equal to a set threshold.

According to a third aspect of the embodiments of the present application, a display screen is provided, the display screen including the aforementioned under-screen optical fingerprint recognition system and a liquid crystal display unit, where the fingerprint recognition chip in the under-screen optical fingerprint recognition system is arranged below the backlight module, and the liquid crystal display unit is arranged above the backlight module.

According to a fourth aspect of the embodiments of the present application, an electronic device is provided, the electronic device including the aforementioned under-screen optical fingerprint recognition system, or the electronic device including the aforementioned backlight module, or the electronic device including the aforementioned display screen.

It can be seen from the above technical solutions that the wavelength of fingerprint detecting light emitted by a first light source of the under-screen optical fingerprint recognition system according to the embodiments of the present application is within a preset wavelength range, so that the wavelength of light carrying fingerprint information that is reflected by a finger from the fingerprint detecting light is also within the preset wavelength range, where the preset wavelength range may be distinguished from the wavelength range of backlight of a backlight module as required. The light carrying fingerprint information can pass through the backlight module to reach a fingerprint recognition chip, and the diffusivity of the light in the backlight module is smaller than or equal to a set threshold, thereby avoiding distortion of the light carrying fingerprint information received by the fingerprint recognition chip, and causing the fingerprint recognition chip to perform reliable and accurate fingerprint recognition based on the received light carrying fingerprint information. The under-screen optical fingerprint recognition system may be applied to a display screen (such as an LCD screen) with a backlight module to meet the requirements of the LCD screen for under-screen fingerprint recognition.

BRIEF DESCRIPTION OF THE DRAWINGS

To describe the technical solutions in the embodiments of the present application or in the related art more clearly, the following briefly introduces the accompanying drawings required for describing the embodiments or the related art.

Apparently, the accompanying drawings in the following description show some embodiments of the present application, and persons of ordinary skill in the art may still derive other drawings from these accompanying drawings without creative efforts.

REFERENCE SIGNS 100, display screen; 101, backlight module; 1011, reflecting portion; 1012, light guiding portion; 1012a, fingerprint recognition region; 1012b, first scattering netted dot; 1012c, second scattering netted dot; 1013, diffusing portion; 1014, polarizing film; 1015, second light source; 102, liquid crystal display unit; 103, protective cover plate; 301, fingerprint recognition chip; 302, first light source; 200, finger.

DETAILED DESCRIPTION

To make the objectives, features, and advantages of the embodiments of the present application more obvious and understandable, the following clearly and completely describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the embodiments of the present application.

The following further describes specific implementations of the embodiments of the present application with reference to the accompanying drawings.

Figure 1:
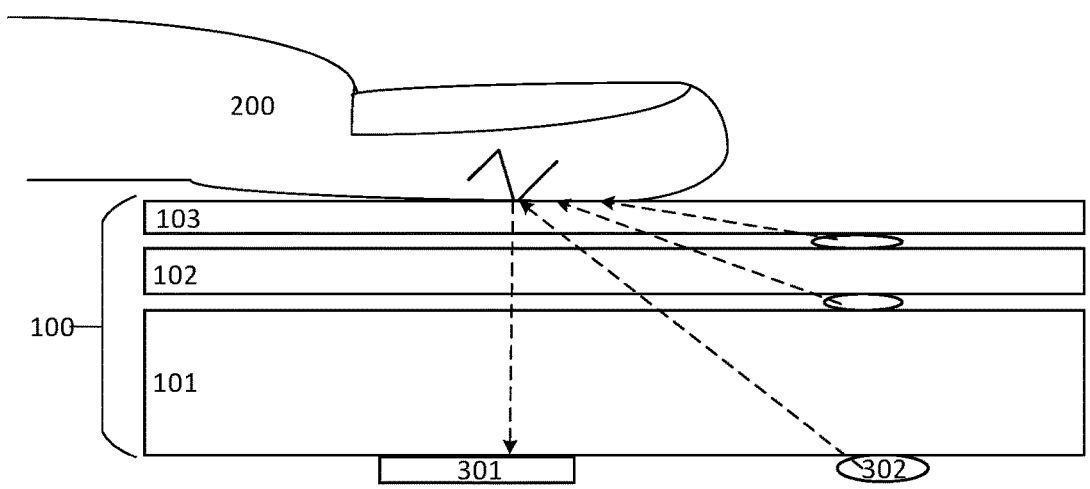
FIG. 1 shows a schematic structural diagram of a display screen with an under-screen optical fingerprint recognition system according to an embodiment of the present application.

According to an embodiment of the present application, an under-screen optical fingerprint recognition system is provided. As shown in FIG. 1, the under-screen optical fingerprint recognition system is applied to a display screen 100 with a backlight module 101. The under-screen optical fingerprint recognition system includes a fingerprint recognition chip 301 and a first light source 302, the wavelength of fingerprint detecting light emitted by the first light source 302 is within a preset wavelength range, the fingerprint recognition chip 301 is arranged below the backlight module 101 of the display screen 100 for receiving light carrying fingerprint information that passes through the backlight module 101 and has a diffusivity smaller than or equal to a set threshold, and the light carrying fingerprint information is reflected by a finger 200 from the light emitted by the first light source 302.

It can be seen that the wavelength of fingerprint detecting light emitted by a first light source 302 of the under-screen optical fingerprint recognition system provided by this embodiment is within a preset wavelength range, so that the wavelength of light carrying fingerprint information that is reflected by a finger 200 from the fingerprint detecting light is also within the preset wavelength range, where the preset wavelength range may be distinguished from the wavelength range of backlight of a backlight module 101 as required. The light carrying fingerprint information can pass through the backlight module 101 to reach a fingerprint recognition chip 301, and the diffusivity of the light in the backlight module 101 is smaller than or equal to a set threshold, thereby avoiding distortion of the light carrying fingerprint information received by the fingerprint recognition chip 301, and causing the fingerprint recognition chip 301 to perform reliable and accurate fingerprint recognition based on the received light carrying fingerprint information. The under-screen optical fingerprint recognition system may be applied to a display screen (such as an LCD screen) with a backlight module to meet the requirements of the LCD screen for under-screen fingerprint recognition.

In order to ensure the accuracy of fingerprint recognition, the fingerprint detecting light emitted by the first light source 302 is distinguished from the light emitted by the backlight module 101 of the display screen applied. For example, if the wavelength of the light emitted by the backlight module 101 within in a wavelength range of visible light, the wavelength of the light emitted by the first light source 302 is within a wavelength range of invisible light.

The preset wavelength range may be specifically set as needed. For example, in this embodiment, the preset wavelength range is an infrared light wavelength range. Of course, in other embodiments, it may also be an ultraviolet light wavelength range or the like.

Figure 2:
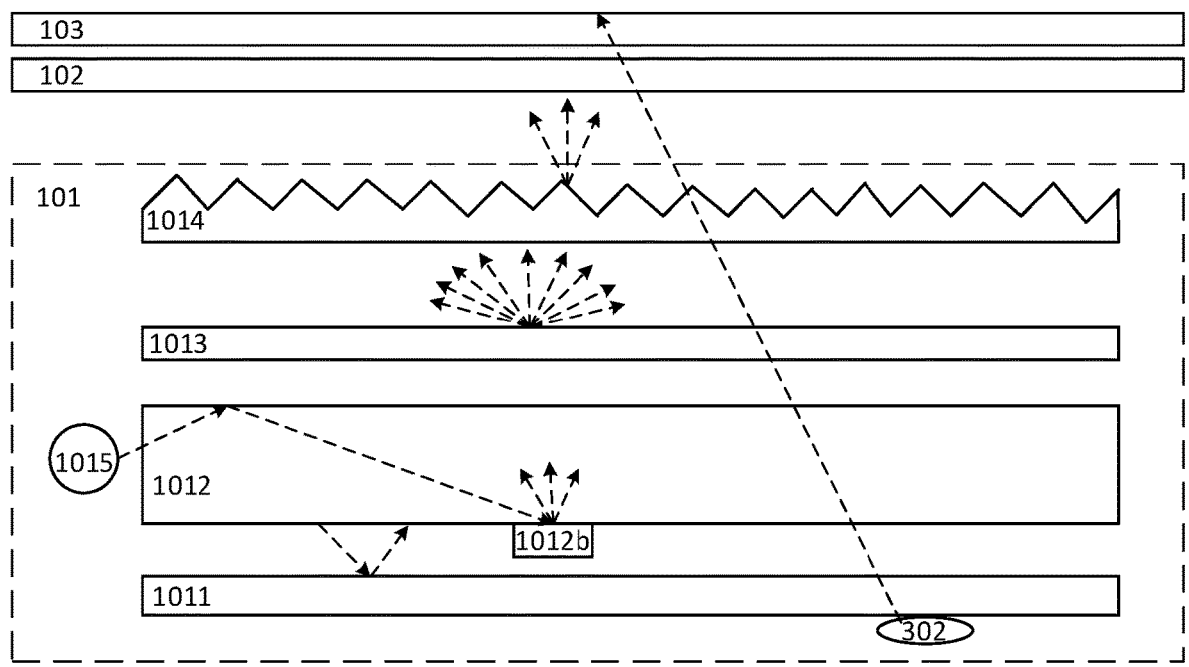
FIG. 2 shows a schematic diagram of an enlarged structure of a backlight module of the display screen with the under-screen optical fingerprint recognition system according to an embodiment of the present application.

Referring to FIG. 1 and FIG. 2, in this embodiment, the under-screen optical fingerprint recognition system may be applied to an LCD screen for under-screen fingerprint recognition. Specifically, the LCD screen includes a backlight module 101, a liquid crystal display unit 102, and a protective cover plate 103. The backlight module 101 specifically includes a diffusing portion 1013, a light guiding portion 1012, a reflecting portion 1011, etc.

The process of fingerprint recognition by the under-screen optical fingerprint recognition system is: after the light emitted by the first light source 302 passes through the backlight module 101, the liquid crystal display unit 102, and the protective cover plate 103 of the LCD screen, the light is reflected by a finger 200 to the LCD screen to form light carrying fingerprint information. The light carrying fingerprint information passes through the protective cover plate 103, the liquid crystal display unit 102, as well as the diffusing portion 1013, the light guiding portion 1012, and the reflecting portion 1011 of the backlight module 101, and then reaches the fingerprint recognition chip 301 below the backlight module 101 of the LCD screen, and the fingerprint recognition chip 301 performs fingerprint recognition based on the received light carrying fingerprint information.

In this process, the protective cover plate 103 and the liquid crystal display unit 102 do not destroy the light carrying fingerprint information, and the diffusivity of the light when passing through the backlight module 101 is smaller than or equal to a set threshold, so the fingerprint recognition accuracy of the fingerprint recognition chip 301 can be ensured.

Specifically, the backlight module 101 includes a diffusing portion 1013 having a diffusivity smaller than or equal to a preset threshold for obliquely incident light carrying fingerprint information, or a diffusing portion 1013 having a diffusivity smaller than or equal to a preset threshold for invisible light. 1013, which ensures that, when the light carrying fingerprint information reflected by the finger 200 passes through the diffusing portion 1013 of the backlight module 101, the diffusivity of at least part of the light is smaller than or equal to a set threshold, thereby ensuring that the diffusing portion 1013 does not destroy the light carrying fingerprint information to cause its distortion, and further ensuring the accuracy of fingerprint recognition.

In order to ensure the recognition accuracy of the fingerprint recognition chip 301, the light guiding portion 1012 of the backlight module 101 is provided with a backlight processing region and a fingerprint recognition region 1012a, the fingerprint recognition region 1012a is used to allow the light carrying fingerprint information to pass, the backlight processing region is used to convert the backlight into light emitted from a front side of the light guiding portion 1012, and the fingerprint recognition chip 301 is arranged corresponding to the fingerprint recognition region 1012a, and receives the light carrying fingerprint information that passes through the fingerprint recognition region 1012a for fingerprint recognition.

For example, at least part of the fingerprint recognition chip 301 is located vertically below the fingerprint recognition region 1012a; or, the fingerprint recognition region 1012a is deviated from the fingerprint recognition chip 301, so that the fingerprint recognition chip 301 receives the light carrying fingerprint information that passes through the fingerprint recognition region 1012a and has an incident angle greater than or equal to an incident angle threshold. Such setting ensures that the distortion of the light carrying fingerprint information received by the fingerprint recognition chip 301 is low.

The reflecting portion 1011 of the backlight module 101 allows the received light carrying fingerprint information within the preset wavelength range to pass, so that the light can smoothly arrive at the fingerprint recognition chip 301, and the backlight within the preset wavelength range can be reflected to improve the backlight intensity of the backlight module 101.

The following further describes the backlight module provided by the embodiment of the present application with reference to FIG. 1 and FIG. 2. According to an embodiment of the present application, the backlight module includes a reflecting portion 1011, a light guiding portion 1012, and a diffusing portion 1013 arranged in sequence; where the reflecting portion 1011 is configured to allow the received light within a preset wavelength range to pass, and to reflect the received backlight beyond the preset wavelength range to the light guiding portion 1012; the light guiding portion 1012 is located above the reflecting portion 1011, and is provided with a backlight processing region and a fingerprint recognition region 1012a, the fingerprint recognition region 1012a being used to allow at least part of the light within the preset wavelength range to pass, and the backlight processing region being used to convert the received backlight into light emitted from a front side of the light guiding portion 1012; and the diffusing portion 1013 is located above the light guiding portion 1012, so that the diffusivity for at least part of the received light within the preset wavelength range is smaller than or equal to a set threshold.

The preset wavelength range is generally set based on the wavelength range of the backlight source, as long as the wavelength range of a light source for fingerprint recognition can be distinguished from the wavelength range of a backlight source.

The reflecting portion 1011 can allow the received light within the preset wavelength range to pass, and reflect the received backlight beyond the preset wavelength range to the light guiding portion 1012, so that the reflecting portion 1011 can meet the requirement of the backlight module for reflecting light, and can also allow the light carrying fingerprint information to pass and arrive at the fingerprint recognition chip 301, and the light carrying fingerprint information is prevented from being distorted at the reflecting portion 1011.

Correspondingly, the light guiding portion 1012 is provided with a fingerprint recognition region 1012a that allows the light carrying fingerprint information to pass, thereby preventing the light carrying fingerprint information from being affected at the light guiding portion 1012 to distort; and the backlight processing region of the light guiding portion 1012 can process the backlight and convert the backlight into light emitted from the front side of the light guiding portion 1012, thereby ensuring that the backlight module can normally provide backlight.

The diffusing portion 1013 is mainly configured to diffuse the backlight, so that the backlight is homogenized and atomized, and the intensity of light everywhere on a light emitting surface of the backlight module is more uniform. In order to prevent the diffusing portion 1013 from diffusing the light carrying fingerprint information to cause distortion, the diffusing portion 1013 adopts a material or structure in which the diffusivity of at least part of the light carrying fingerprint information is smaller than or equal to a set threshold. Thus, the backlight module of the present application can meet the use requirement of a display screen (e.g., an LCD screen) to provide backlight for the LCD screen, ensure that the light carrying fingerprint recognition information is not seriously distorted when passing through the backlight module, further ensure the accuracy of fingerprint recognition, and enable the LCD screen using the backlight module to realize under-screen fingerprint recognition.

The specific structure and working principle of the backlight module and the display screen using the backlight module are described in detail below:

The backlight module 101 is mainly configured to provide uniform backlight having sufficient brightness for the display screen 100, so that the liquid crystal display unit 102 modulates the backlight later as needed to display different images. The protective cover plate 103 may be a glass cover plate, and is mainly configured to protect the display screen without affecting the display effect.

When the under-screen fingerprint recognition system is applied to the display screen 100, the first light source 302 of the under-screen fingerprint recognition system is arranged below at least one of the backlight module 101, the liquid crystal display unit 102, and the protective cover plate 103 for emitting light for fingerprint recognition.

When the finger 200 is placed on the display screen, at least part of the light for fingerprint recognition is reflected by the finger 200 toward the inside of the display screen. Because the surface of the finger 200 has concave-convex fingerprints, the light reflected by different positions of the finger 200 is different, that is, the light reflected by the finger 200 carries fingerprint information. The light carrying fingerprint information finally passes through the backlight module 101 to reach the fingerprint recognition chip 301 below the backlight module 101, and the fingerprint recognition chip 301 performs fingerprint recognition based on the acquired light carrying fingerprint information.

As shown in FIG. 2, in this embodiment, the backlight module 101 mainly includes a reflecting portion 1011, a light guiding portion 1012, a diffusing portion 1013, a second light source 1015, etc.

The second light source 1015 is a backlight source, and is mainly configured to emit backlight. Different light sources may be used as the backlight source based on different needs. For example, a light bulb or the like is used, as long as the second light source 1015 is capable of emitting visible light.

Accordingly, in order to distinguish the backlight source, the first light source 302 is configured to emit light for fingerprint recognition (the wavelength of the light is within a preset wavelength range). For example, the first light source 302 may be a light source capable of emitting infrared light to distinguish the wavelength of light for fingerprint recognition from the wavelength of visible light as a backlight. However, the first light source is not limited to infrared light. In practical applications, those skilled in the art may also use other light that is different from the visible light of the backlight, e.g., ultraviolet light, etc.

The first light source 302 may be a suitable light source selected as required, e.g., an LED, a VCSEL (Vertical Cavity Surface Emitting Laser) or a CCFL (Cold Cathode Fluorescent Lamp) tube, etc., which can be hidden under the LCD screen or set at other suitable position. The light emitted by the first light source 302 may have a spectral range of 780 to 1100 nm, preferably 850 to 940 nm, etc. In this way, the different characteristics of visible light and infrared light in various types of films can ensure the uniformity of the backlight and ensure low distortion of the light carrying fingerprint signals, thereby ensuring high accuracy of fingerprint recognition.

Optionally, the backlight module includes at least one first light source 302. The first light source 302 may be arranged below at least one of the backlight module 101, the liquid crystal display unit 102, and the protective cover plate 103.

In this embodiment, the second light source 1015 is arranged on one side of the light guiding portion 1012, and the backlight enters the light guiding portion 1012 from the side of the light guiding portion 1012. The light guiding portion 1012 guides point light, linear light or the like emitted by the second light source 1015, and emits the light from the front side thereof.

The light guiding portion 1012 may include a light guide plate or a light guide film or the like, which is not limited in the present application.

For example, the light guiding portion 1012 includes a light guide plate made of an optical acrylic or PC material, which has extremely high reflectivity and does not absorb light. The conventional light guide plate is printed with first scattering netted dots 1012b on the bottom surface by laser engraving, V-shaped cross grid engraving, UV screen printing, etc., and the first scattering netted dots 1012b are made of a high reflective material.

The light conversion process of the light guide plate is: when the backlight on the side is incident into the light guide plate, if the incident angle satisfies a total reflection angle, the backlight is totally reflected on the front side of the light guide plate to reach the bottom surface of the light guide plate, and the backlight irradiated onto the first scattering netted dots 1012b may form emergent light perpendicular to the front side of the light guide plate (or having an angle smaller than a certain value with the front side of the light guide plate) due to the scattering effect of the first scattering netted dots 1012b, thereby achieving uniform light emission of the light guide plate.

Optionally, in order to enhance the effects of light guidance and uniform light, the front side of the light guide plate is further provided with V-cut slots, the first scattering netted dots 1012b are arranged on the bottom surface of the light guide plate, and the V-cut slots cooperate with the scattering netted dots 1012b to convert the side backlight into preliminarily homogenized front dot matrix emergent light.

In the presence of the first scattering netted dots 1012b and the V-cut slots on the light guide plate, the light carrying fingerprint information is destroyed when passing through the light guide plate, causing distortion of the light carrying fingerprint information that passes through the light guide plate, so that the accuracy of subsequent fingerprint recognition by the fingerprint recognition chip 301 based on the received light carrying fingerprint information is low, which affects the application of under-screen optical fingerprint recognition.

In order to solve this problem, the light guide plate is provided with a backlight processing region and a fingerprint recognition region 1012a in the present application. The backlight processing region is used to process backlight and convert the backlight into light emitted from the front side of the light guide plate to meet the display requirement of the display screen. The fingerprint recognition region 1012a is mainly for light to pass directly without affecting the light, thereby avoiding distortion of the light. It should be noted that the fingerprint recognition region 1012a in the present application is mainly for light carrying fingerprint information to pass.

Figure 3:
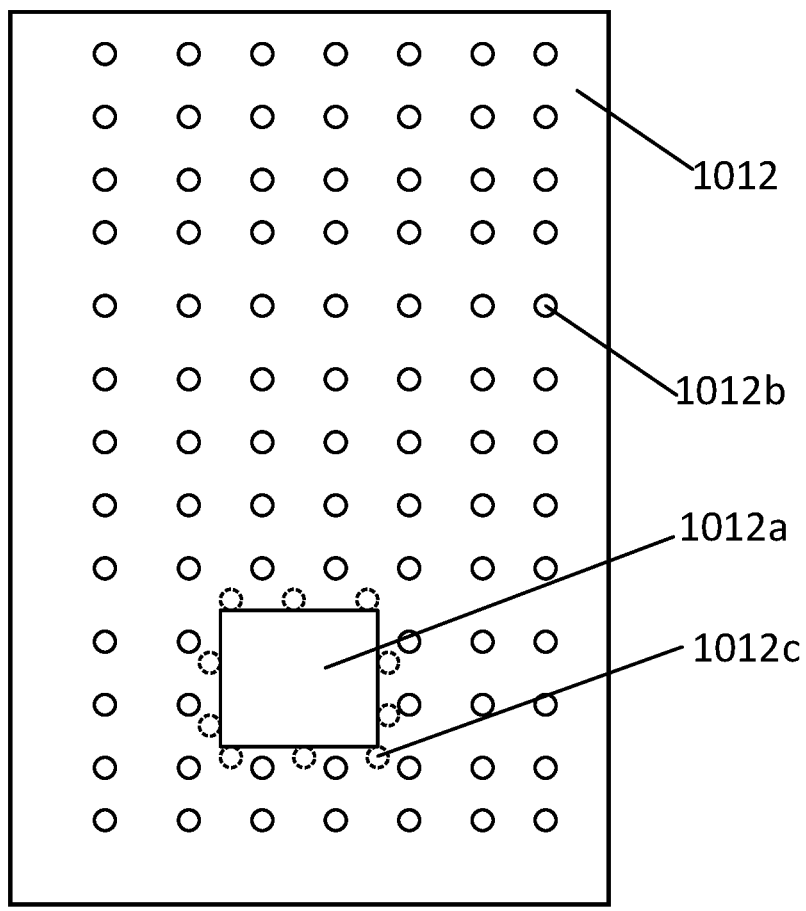
FIG. 3 shows a schematic structural diagram of a light guiding portion, cooperating with the under-screen optical fingerprint recognition system, of the backlight module according to an embodiment of the present application.

Specifically, in a feasible manner, a plurality of first scattering netted dots 1012b is arranged in the backlight processing region, while no first scattering netted dot is arranged in the fingerprint recognition region 1012a. Or at least one first scattering netted dot is arranged in the fingerprint recognition region 1012a, and the density of the first scattering netted dots in the fingerprint recognition region 1012a is smaller than the density of the first scattering netted dots in the backlight processing region. The first scattering netted dots 1012b or other structures that may destroy the light carrying fingerprint information are not arranged or arranged as few as possible in the fingerprint recognition region 1012a, thereby avoiding the distortion of the light carrying fingerprint information, and further ensuring the accuracy of fingerprint recognition. A structural schematic diagram of a light guide plate is as shown in FIG. 3.

It should be noted that, based on the difference in fingerprint recognition accuracy requirements, if the first scattering netted dots 1012b are arranged in the fingerprint recognition region 1012a, the density thereof may be determined by specific needs.

The V-cut slots (not shown) and the scattering netted dots 1012b avoid the fingerprint recognition region 1012a, or the V-cut slots and the scattering netted dots 1012*b* in the fingerprint recognition region 1012*a* are sparse, so that the light carrying fingerprint information is not destroyed when passing through the fingerprint recognition region 1012*a*, or is only slightly destroyed, tiny distortion of the passing light carrying fingerprint information is ensured, and the accuracy and reliability of subsequent fingerprint recognition are further ensured.

Optionally, in order to ensure the display effect of the display screen so that the uniformity of light emitted by the backlight module is good, a plurality of second scattering netted dots 1012*c* arranged along the periphery of the fingerprint recognition region 1012*a* is further provided in the backlight processing region. By providing the second scattering netted dots 1012*c* on the periphery of the fingerprint recognition region 1012*a*, the backlight on the periphery of the fingerprint recognition region 1012*a* is relatively dense, and the backlight scattered to the fingerprint recognition region 1012*a* can be adjusted using the second scattering netted dots 1012*c*, thereby overcoming the defect of low intensity of the backlight emitted from the front side of the light guide plate to the fingerprint recognition region 1012*a*.

The reflecting portion 1011 is arranged below the light guiding portion 1012 to reflect light leaking from each layer of the backlight module 101 to the light emitting surface of the backlight module 101, thereby improving the efficiency of the backlight module and improving the brightness. The light reflected back into the light guiding portion 1012 may directly pass through the light guiding portion 1012 and be emitted from the front side thereof, and may also be totally reflected in the light guiding portion 1012, scattered from the first scattering netted dots 1012*b* and the second scattering netted dots 1012*c*, and then emitted from the front side of the light guiding portion 1012.

However, during fingerprint recognition, the light carrying fingerprint information passes through the reflecting portion 1011 when being transmitted from the front side of the display screen to the fingerprint recognition chip 301. In this embodiment, the reflecting portion 1011 includes a reflecting film in order to prevent the light carrying fingerprint information from being reflected so that the fingerprint recognition chip 301 cannot receive light for fingerprint recognition, and to ensure that the reflecting portion 1011 can reflect backlight and the light carrying fingerprint information can pass so that the fingerprint recognition chip 301 can receive light for fingerprint recognition. The reflecting film includes at least one of a band-pass filter, a high-pass filter, and an enhanced specular reflector. When the reflecting film is an enhanced specular reflector (ESR), the specific material and structure thereof can be adjusted to allow infrared light to pass and reflect visible light.

Figure 4:
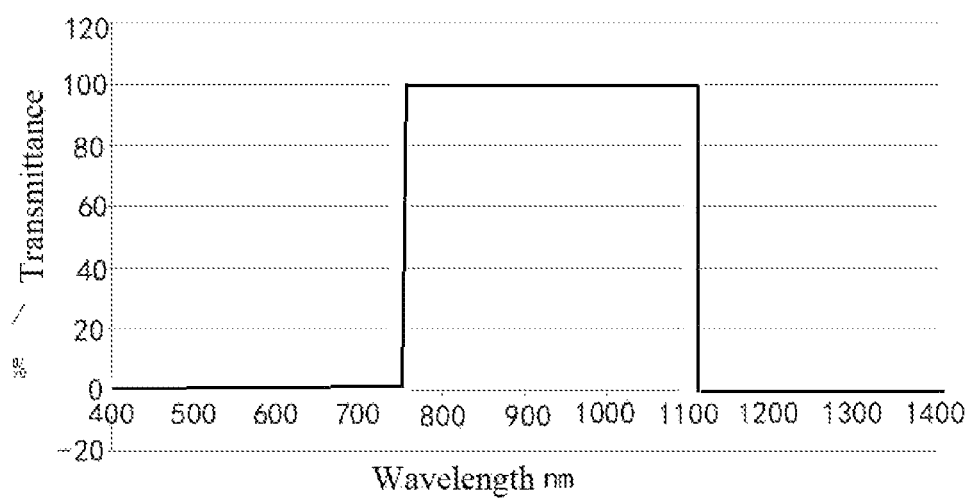
FIG. 4 shows a light transmittance spectral characteristic diagram of a reflecting portion of the backlight module according to an embodiment of the present application.

In this way, during operation, the backlight is visible light that is emitted back when passing through the reflecting film, while the light carrying fingerprint information is infrared light that can smoothly pass through the reflecting film. The spectral characteristics of light transmittance of the reflecting film of the present application are as shown in FIG. 4. The reflecting portion 1011 allows the light having a wavelength of 750 to 1100 nm to pass, while the light of other wavelength ranges is reflected by the reflecting portion 1011.

The diffusing portion 1013 atomizes the dot matrix beam emitted from the front side of the light guide plate, so that the light is more uniform, and the side light is scattered to the front side to improve the brightness of the front side. When the light carrying fingerprint information passes through the diffusing portion 1013 with such an effect, the light is also atomized, resulting in signal distortion.

In order that the light carrying fingerprint information can smoothly pass through the diffusing portion 1013 without distortion while the function of diffusing backlight by the diffusing portion 1013 is retained, the diffusing portion 1013 causing the diffusivity of at least part of the light carrying fingerprint information to be smaller than or equal to a set threshold is used in this embodiment.

Various specific implementations of the diffusing portion 1013 will be described below.

The first type of diffusing portion 1013 includes a diffusing film made of a film material having different diffusing properties for light of different wavelengths, and such a diffusing film diffuses light by using the principle that diffusing particles of certain size have different degrees of diffusing light of various wavelengths. After the light of different wavelengths passes, the degree of diffusion is greatly different. If the wavelength is longer, the diffusivity is higher.

For example, the diffusing portion 1013 includes a first diffusing film, and the diffusivity of the first diffusing film for the light within the preset wavelength range is smaller than or equal to the set threshold. In other words, the diffusivity of the first diffusing film for the infrared light carrying fingerprint information is smaller than or equal to the set threshold, thereby ensuring that the light carrying fingerprint information is not distorted when passing through the first diffusing film. The set threshold is determined by the required fingerprint recognition accuracy or the recognition accuracy of the cooperative fingerprint recognition chip 301, for example, 1%, 5% or 10%, etc.

Figure 5:
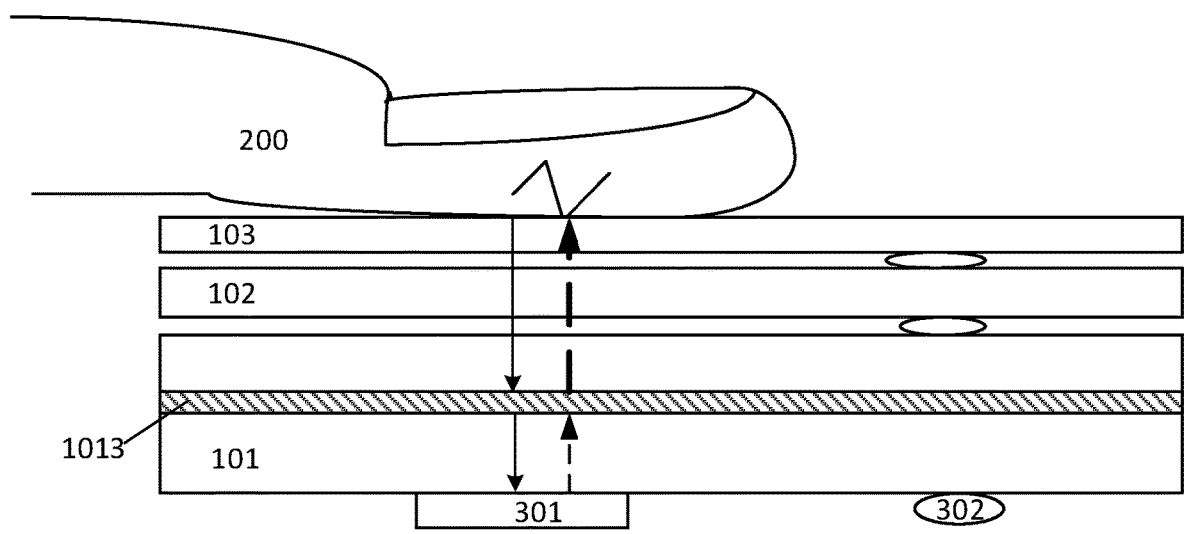
FIG. 5 shows a schematic structural diagram of a first diffusing portion used in a backlight module in a display screen according to an embodiment of the present application.

The first diffusing film has different diffusion characteristics for infrared light and visible light of different wavelengths, that is, the first diffusing film has higher diffusivity for visible light (shown by a dotted line in FIG. 5), but has low or no diffusivity for infrared light, so that the backlight is diffused into uniform light after passing through the first diffusing film, and the light carrying fingerprint information is not changed, which ensures the uniformity of the backlight and the fidelity of fingerprint signals. The optical paths of the visible light and the light carrying fingerprint information in the first diffusing film are as shown in FIG. 5.

For such a diffusing portion 1013, the fingerprint recognition chip 301 may be arranged corresponding to the fingerprint recognition region 1012*a* on the light guiding portion 1012, directly below it, or at least partially directly below it.

The second type of diffusing portion 1013 includes a second diffusing film that has a diffusing effect on vertically incident light but does not have a diffusing effect on obliquely incident light. The characteristics of the second diffusing film are similar to those of glass. In other words, the diffusivity of the second diffusing film for the light that has an incident angle greater than or equal to an incident angle threshold (the incident angle threshold may be different based on the difference in material of the second diffusing film, for example, OPTERIA DF series diffusing film of LINTEC Corporation) and carries fingerprint information is smaller than or equal to a set threshold. The light guiding portion 1012 converts the backlight into dot matrix light emitted from the front side, the diffusing portion 1013 is located above the light guiding portion 1012, and the backlight is substantially vertically incident to the second diffusing film, which can uniformly diffuse the backlight; and the incident angle of the light carrying fingerprint information reflected by the finger 200 incident to the second diffusing film is relatively dispersed, and the second diffusing film has poor diffusivity for the light carrying fingerprint information with the incident angle greater than the incident angle threshold, but does not destroy the light having the diffusivity smaller than or equal to the set threshold, so that fidelity on the light carrying fingerprint information is achieved.

For such type of diffusing portion 1013, in order to ensure the accuracy of fingerprint recognition, the fingerprint recognition chip 301 is deviated from the fingerprint recognition region 1012a of the light guiding portion 1012, that is, the fingerprint recognition region 1012a is deviated from the fingerprint recognition chip 301 below the reflecting portion 1011, so that the fingerprint chip receives the light having an incident angle greater than or equal to the incident angle threshold and carrying fingerprint information. Thus, an angle θ is formed between the connecting line of the fingerprint pressing region on the LCD screen 100, the fingerprint recognition region 1012a on the light guiding portion 1012 and the fingerprint recognition chip 301 and the vertical line, so that the light carrying fingerprint information on the fingerprint recognition chip 301 is undistorted light, and the accuracy of fingerprint recognition is further ensured.

Figure 6:
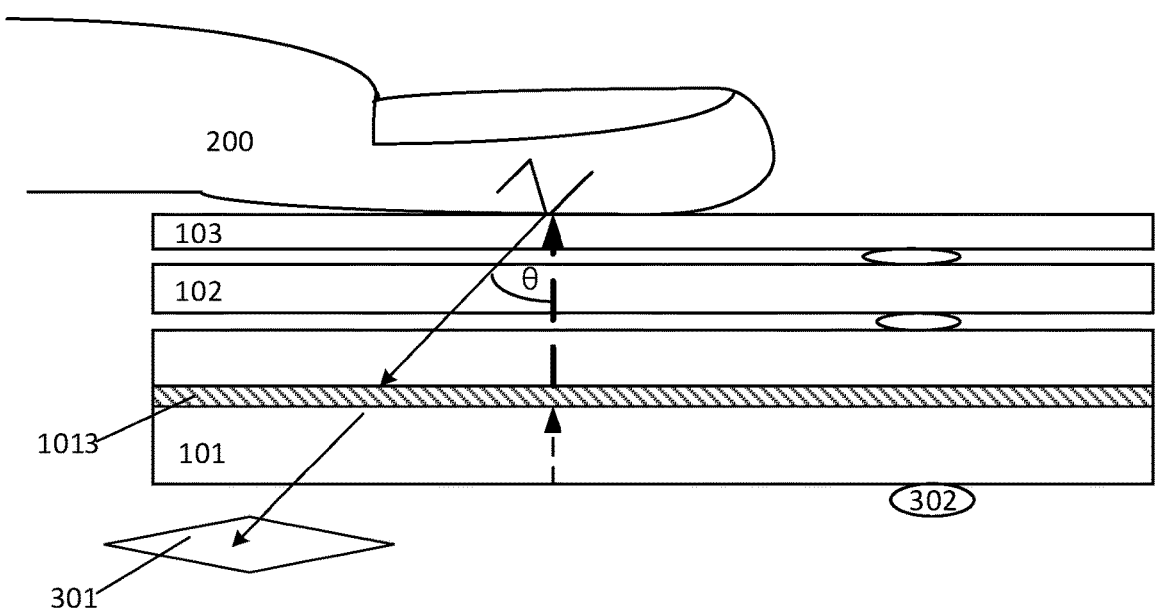
FIG. 6 shows a schematic structural diagram of a second diffusing portion used in a backlight module in a display screen according to an embodiment of the present application.

A schematic diagram of the light propagation path of the LCD screen 100 using the second diffusing film is as shown in FIG. 6. The dotted line shows the backlight, and the solid line shows the light carrying fingerprint information. It can be seen from FIG. 6 that, the visible light emitted from the second light source 1015 enters the light guiding portion 1012, exits from the front side of the light guiding portion 1012, and then diffuses through the diffusing portion 1013 to form emergent backlight, and the emergent backlight enters the liquid crystal display unit 102 and then exits through the protective cover plate 103. The light for fingerprint recognition emitted from the first light source 104 passes through the backlight module 101, the liquid crystal display unit 102, and the protective cover plate 103, and is reflected by the finger 200 to form light carrying fingerprint information. After part of the light carrying fingerprint information passes through the liquid crystal display unit 102 and the protective cover plate 103, the incident angle of the light incident to the diffusing portion 1013 is greater than the incident angle threshold of the diffusing portion 1013, and the diffusing portion 1013 diffuses little the part of light carrying fingerprint information, so that the part of light carrying fingerprint information is kept fidelity, and reaches the fingerprint recognition chip 301 directly through the fingerprint recognition region of the light guiding portion 1012 and the reflecting portion 1011. The fingerprint recognition chip 301 performs fingerprint recognition based on the fidelity-keeping light carrying fingerprint information, so that the accuracy of recognition is high, and under-screen fingerprint recognition of the LCD screen is achieved.

The third type of diffusing portion 1013 includes an electronically controlled atomization film, the backlight module further includes a control assembly connected to the electronically controlled atomization film, and the control assembly controls the electronically controlled atomization film to be in a transparent state when power is on and to be in an atomized state when power is off.

When the display screen (e.g., an LCD screen) displays normally, fingerprint recognition is not required, and the electronically controlled atomization film is in the power-off high atomized state. When fingerprint data is acquired for fingerprint recognition, the electronically controlled atomization film is in the power-on full transparent state.

In this case, the fingerprint recognition region 1012a on the light guiding portion 1012 and the fingerprint recognition chip 301 below the reflecting portion 1011 may be arranged correspondingly. That is, at least part of the fingerprint recognition chip 301 is located directly below the fingerprint recognition region 1012a.

Optionally, in order to improve the display brightness of the LCD screen 100, the backlight module is provided with a prism film in the related art, which reduces the angle of uniform light from the diffusing portion 1013 to improve the brightness of emergent light within a certain viewing angle range. Due to the structural limitation of the prism film, the light carrying fingerprint information is affected and distorted. In order to solve this problem, in this embodiment, the prism film may not be provided, or other structure is used instead of the prism film.

For example, the backlight module may further include a reflective polarizing film 1014 (dual brightness enhancement film (DBEF), the polarizing film 1014 is used to replace the existing prism film, and the polarizing film 1014 is arranged above the diffusing portion 1013 to improve the brightness. The DBEF can improve the brightness by about 50% without distorting the light carrying fingerprint information.

Alternatively, the brightness is improved by increasing the power or amount of the light source, thereby omitting the prism film.

One or more of the above several films are used to replace the original film, or two or more of the above several functional films are synthesized into a film, or the above films are freely combined, and the under-screen fingerprint detection application of the LCD can be achieved, as long as the backlight meets the required requirement and the fingerprint signals reach certain signal-to-noise ratio.

The following illustrates several backlight modules 101 having different structures and characteristics and capable of ensuring the accuracy of fingerprint recognition.

Figure 7:
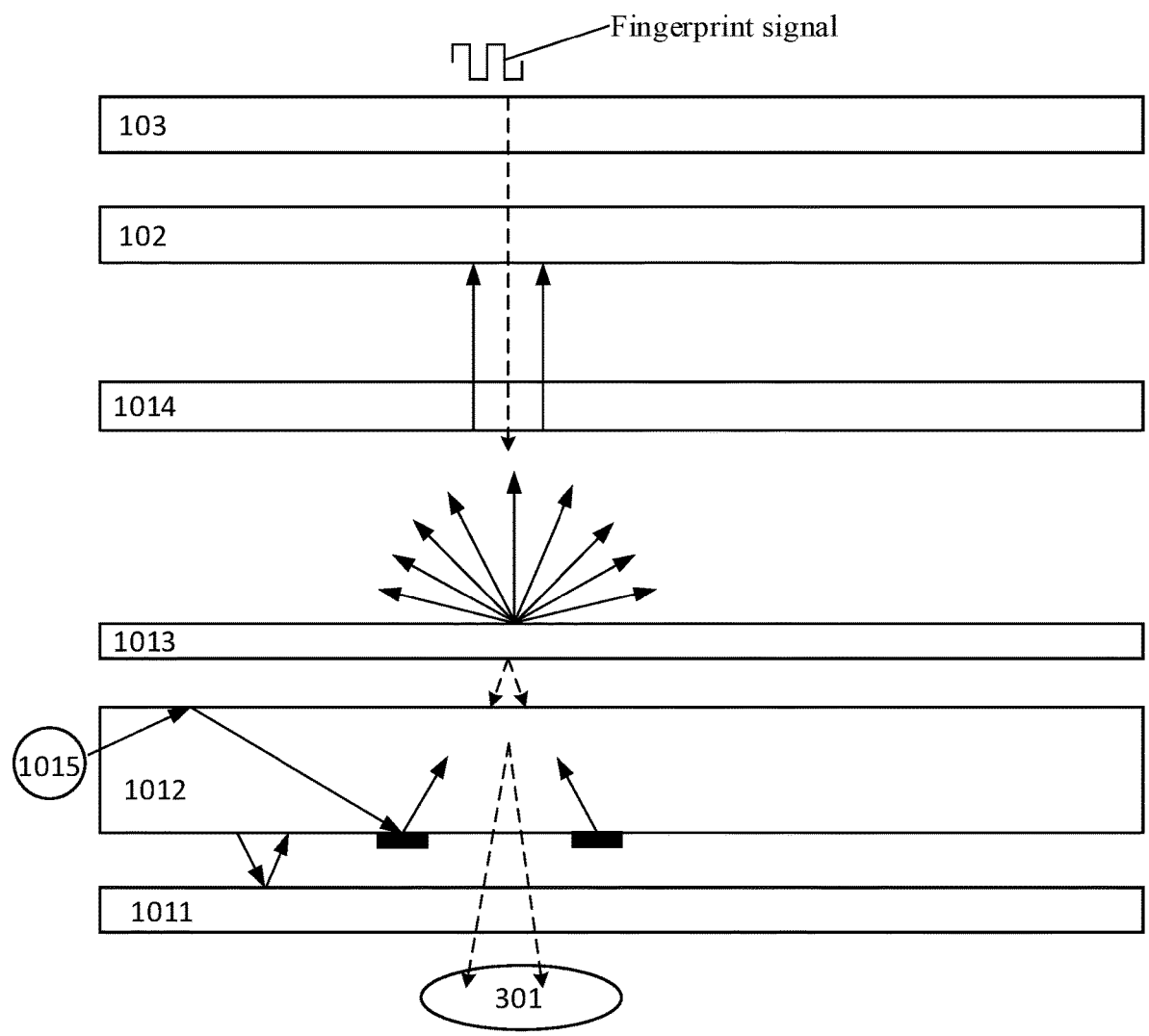
FIG. 7 shows a schematic structural diagram of a display screen using a first backlight module according to an embodiment of the present application.

The structure of the display screen 100 using the first type of backlight module 101 is as shown in FIG. 7, where the dotted line indicates light carrying fingerprint information, and the solid line indicates backlight. The backlight module 101 includes a reflecting portion 1011 for infrared light to pass, a light guiding portion 1012 with a fingerprint recognition region 1012a, a diffusing portion 1013 having tiny diffusivity for infrared light, and a DBEF (indicated by 1014 in the figure). Due to the characteristics of infrared light and the transmittance of respective layers of the film to the infrared light, the infrared light carrying fingerprint information passes through the DBEF, the light guiding portion 1012 and the reflecting portion 1011 to achieve a similar effect as passing through a layer of glass. The infrared light is slightly scattered when passing through the diffusing portion 1013, which is within the acceptable range for fingerprint signals, the infrared fingerprint signals are not distorted too much, and the fingerprint signals can be restored relatively truly. The backlight is visible light, the reflecting portion 1011 reflects most of the visible light to the display surface of the display screen 100, the light guiding portion 1012 provides enough light for the fingerprint region by supplementing light, and the diffusing portion 1013 diffuses the visible light very strongly, so that the backlight is still uniform light out of the screen, and the DBEF can increase the brightness and reduce the power consumption.

Figure 8:
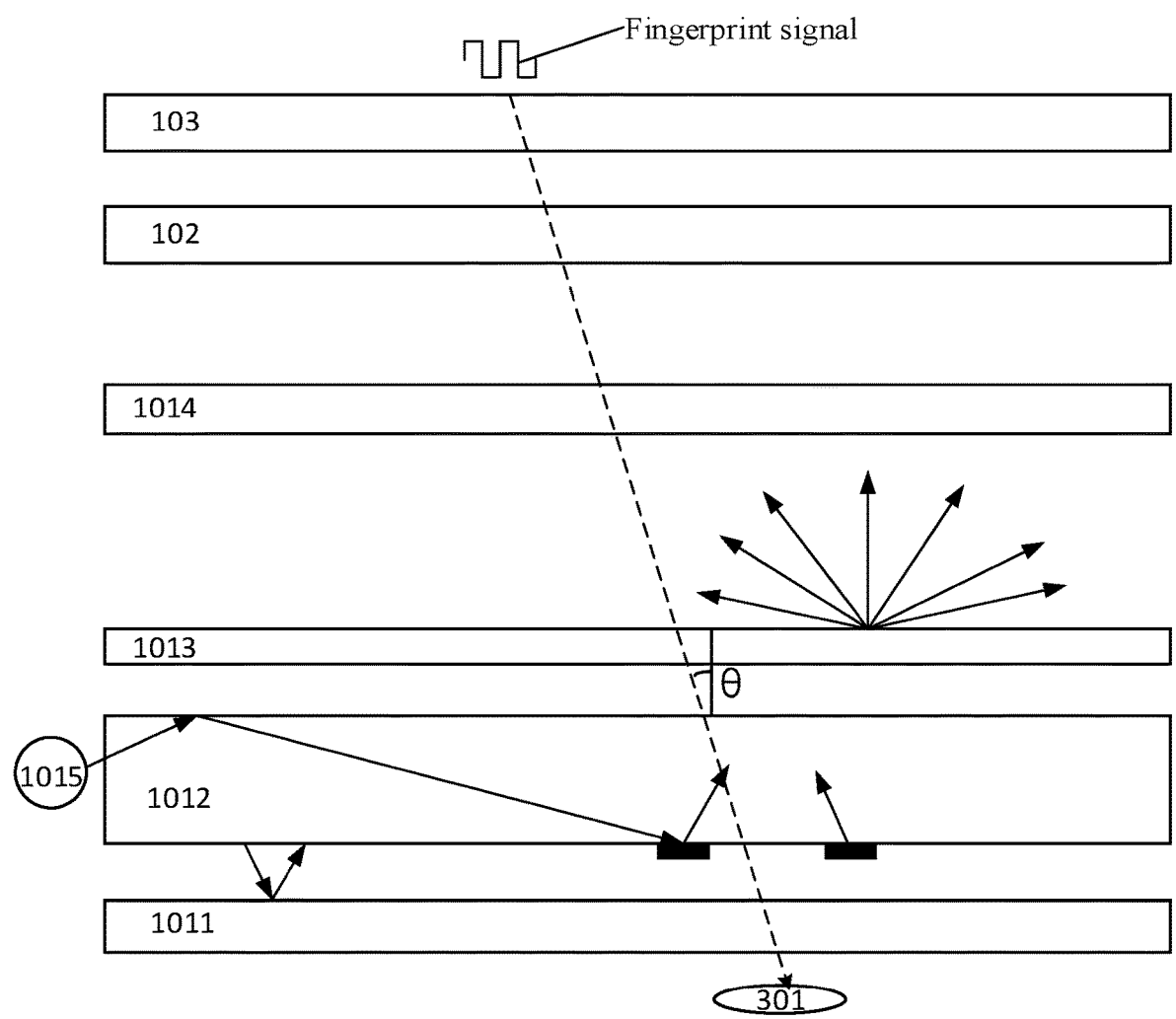
FIG. 8 shows a schematic structural diagram of a display screen using a second backlight module according to an embodiment of the present application.

The structure of the display screen 100 using the second type of backlight module 101 is as shown in FIG. 8, where the dotted line indicates light carrying fingerprint information, and the solid line indicates backlight. The backlight module 101 includes a reflecting portion 1011 for infrared light to pass, a light guiding portion 1012 with a fingerprint recognition region 1012a, a diffusing portion 1013 having tiny diffusivity for infrared light that has an incident angle greater than an incident angle threshold, and a DBEF (indicated by 1014 in the figure). The diffusing portion 1013 plays a role in homogenizing the backlight in the vertical direction, and the incident angle when the light carrying fingerprint recognition information reflected by the finger 200 is incident to the diffusing portion 1013 is larger than the incident angle threshold, the light is not scattered or homogenized by the diffusing portion 1013, so that undistorted transmission is achieved.

Figure 9:
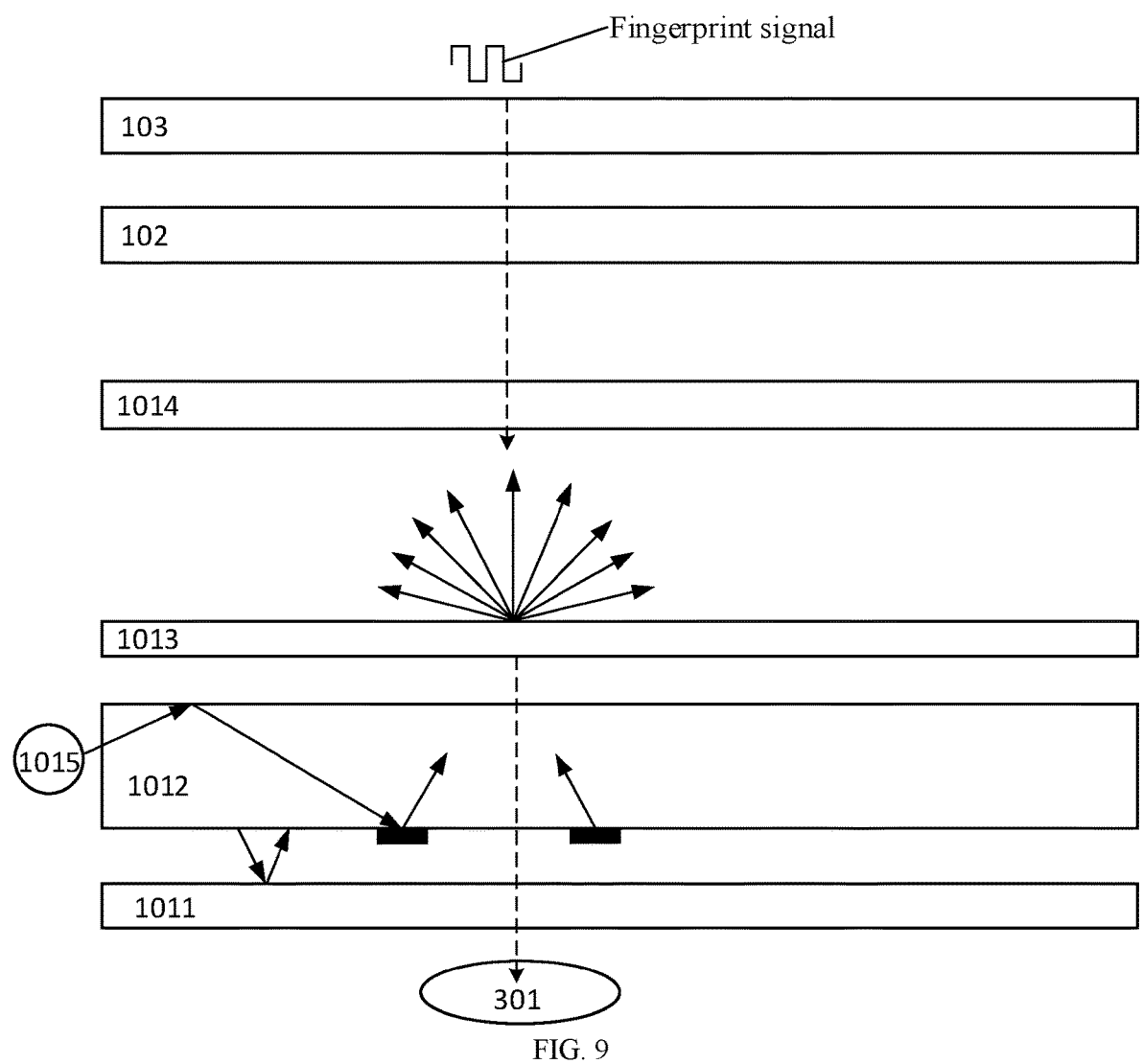
FIG. 9 shows a schematic structural diagram of a display screen using a third backlight module according to an embodiment of the present application.

The structure of the display screen using the third type of backlight module 101 is as shown in FIG. 9, where the dotted line indicates light carrying fingerprint information, and the solid line indicates backlight. The backlight module 101 includes a reflecting portion 1011 for infrared light to pass, a light guiding portion 1012 with a fingerprint recognition region 1012a, an electronically controlled atomization film as a diffusing portion 1013, and a DBEF (indicated by 1014 in the figure). When the fingerprint detection function is not used, the electronically controlled atomization film is not powered on, the diffusing portion 1013 is in an atomized state to diffuse and homogenize light; when the fingerprint detection function is used, the electronically controlled atomization film is powered on, the diffusing portion 1013 is in a transparent glassy state, and the light carrying fingerprint information can substantially pass through without loss.

Of course, in addition to the diffusing portion 1013, the light guiding portion 1012, and the reflecting portion 1011 described above, other structures capable of homogenizing and brightening the backlight, and causing the fingerprint signals to meet the requirements of recognition may be used.

Optionally, according to an embodiment of the present application, a display screen is provided, including the foregoing under-screen optical fingerprint recognition system and a liquid crystal display unit, where the fingerprint recognition chip 301 in the under-screen optical fingerprint recognition system is arranged below the backlight module 101, and the liquid crystal display unit 102 is arranged above the backlight module 101.

The backlight module 101 of the LCD screen can improve the fidelity of fingerprint signals of infrared light by each layer of the film, and the appropriate combination of infrared light transmittance characteristics of respective layers of the film ensures that infrared fingerprint signals can be transmitted to the fingerprint recognition chip 301 with little distortion, thereby ensuring the accuracy of fingerprint recognition.

According to an embodiment of the present application, an electronic device is provided, including the under-screen optical fingerprint recognition system, or the backlight module, or the display screen described above.

The under-screen optical fingerprint recognition system of the electronic device can be arranged under the display screen with the backlight module, and can perform accurate fingerprint recognition, thereby improving the screen ratio of the electronic device and realizing a full screen.

Finally, it should be noted that the foregoing embodiments are merely intended for describing the technical solutions of the embodiments of the present application, but not for limiting the present application. Although the embodiments of the present application are described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An under-screen optical fingerprint recognition system, applicable to a display screen with a backlight module, the backlight module comprising a diffusing portion and a light guiding portion, wherein the under-screen optical fingerprint recognition system comprises
   a fingerprint recognition chip; and
   a first light source,
   wherein the first light source is configured to emit light for fingerprint detection within a preset wavelength range, the fingerprint recognition chip is arranged below the backlight module for receiving light carrying fingerprint information that passes through the backlight module, wherein the diffusivity of at least part of the light carrying fingerprint information is less than or equal to a set threshold when the light carrying fingerprint information passes through the diffusing portion of the backlight module, and the light carrying fingerprint information is generated when light emitted by the first light source is reflected by a finger above the display screen; and
   wherein the light guiding portion is provided with a backlight processing region and a fingerprint recognition region; a plurality of first scattering netted dots for reflecting light is provided in the backlight processing region to convert backlight generated by a second light source into light emitted from a front side of the light guiding portion, and no first scattering netted dot is arranged in the fingerprint recognition region, or a density of the first scattering netted dots in the fingerprint recognition region is smaller than a density of the first scattering netted dots in the backlight processing region to allow the light carrying fingerprint information to pass.

2. The under-screen optical fingerprint recognition system according to claim 1, wherein the fingerprint recognition chip is arranged corresponding to the fingerprint recognition region, and receives the light carrying fingerprint information that passes through the fingerprint recognition region.

3. The under-screen optical fingerprint recognition system according to claim 2, wherein at least part of the fingerprint recognition chip is located vertically below the fingerprint recognition region; or, the fingerprint recognition region is deviated from the fingerprint recognition chip, so that the fingerprint recognition chip receives the light carrying fingerprint information that passes through the fingerprint recognition region and has an incident angle greater than or equal to an incident angle threshold.

4. The under-screen optical fingerprint recognition system according to claim 2, wherein the backlight module comprises a reflecting portion, and the reflecting portion is structured to allow the received light carrying fingerprint information within the preset wavelength range to pass, and reflects the received backlight beyond the preset wavelength range.

5. The under-screen optical fingerprint recognition system according to claim 4, wherein the light guiding portion is located above the reflecting portion, and the diffusing portion is located above the light guiding portion.

6. The under-screen optical fingerprint recognition system according to claim 5, wherein the reflecting portion comprises a reflecting film, the reflective film comprising at least one of a band-pass filter, a high-pass filter, and an enhanced specular reflector.

7. The under-screen optical fingerprint recognition system according to claim 5, wherein the diffusing portion comprises an electronically controlled atomization film, the backlight module further comprises a control assembly connected to the electronically controlled atomization film, and the control assembly controls the electronically controlled atomization film to be in a transparent state when power is on and to be in an atomized state when power is off.

8. The under-screen optical fingerprint recognition system according to claim 5, wherein the diffusing portion comprises a first diffusing film, and the diffusivity of the first diffusing film for the light within the preset wavelength range is smaller than or equal to the set threshold.

9. The under-screen optical fingerprint recognition system according to claim 5, wherein the diffusing portion comprises a second diffusing film, and the diffusivity of the second diffusing film for the light that has an incident angle greater than or equal to an incident angle threshold and carries fingerprint information is smaller than or equal to the set threshold.

10. The under-screen optical fingerprint recognition system according to claim 1, wherein a plurality of second scattering netted dots for scattering backlight to the fingerprint recognition region is further provided in the backlight processing region, and the second scattering netted dots are arranged along the periphery of the fingerprint recognition region.

11. A display screen, comprising:
a liquid crystal display unit;
a backlight module arranged under the liquid crystal display unit, the backlight module comprising a diffusing portion and a light guiding portion; and
an under-screen optical fingerprint recognition system, wherein the under-screen optical fingerprint recognition system comprises:
a fingerprint recognition chip; and
a first light source,
wherein the first light source is configured to emit light for fingerprint detection within a preset wavelength range, the fingerprint recognition chip is arranged below the backlight module for receiving light carrying fingerprint information that passes through the backlight module, wherein the diffusivity of at least part of the light carrying fingerprint information is less than or equal to a set threshold when the light carrying fingerprint information passes through the diffusing portion of the backlight module, and the light carrying fingerprint information is generated when light emitted by the first light source is reflected by a finger above the display screen; and
wherein the light guiding portion is provided with a backlight processing region and a fingerprint recognition region; a plurality of first scattering netted dots for reflecting light is provided in the backlight processing region to convert backlight generated by a second light source into light emitted from a front side of the light guiding portion, and no first scattering netted dot is arranged in the fingerprint recognition region, or a density of the first scattering netted dots in the fingerprint recognition region is smaller than a density of the first scattering netted dots in the backlight processing region to allow the light carrying fingerprint information to pass.

12. The display screen according to claim 11, further comprising a protective cover plate, the first light source of the under-screen optical fingerprint recognition system being arranged below at least one of the backlight module, the protective cover plate, and the liquid crystal display unit.

13. An electronic device, comprising:
an under-screen optical fingerprint recognition system arranged under a display screen having a backlight module, the backlight module comprising a diffusing portion and a light guiding portion, wherein the under-screen optical fingerprint recognition system comprises:
a fingerprint recognition chip: and
a first light source;
wherein the first light source is configured to emit light for fingerprint detection within a preset wavelength range, the fingerprint recognition chip is arranged below the backlight module for receiving light carrying fingerprint information that passes through the backlight module, wherein the diffusivity of at least part of the light carrying fingerprint information is less than or equal to a set threshold when the light carrying fingerprint information passes through the diffusing portion of the backlight module, and the light carrying fingerprint information is generated when light emitted by the first light source is reflected by a finger above the display screen; and
wherein the light guiding portion is provided with a backlight processing region and a fingerprint recognition region; a plurality of first scattering netted dots for reflecting light is provided in the backlight processing region to convert backlight generated by a second light source into light emitted from a front side of the light guiding portion, and no first scattering netted dot is arranged in the fingerprint recognition region, or a density of the first scattering netted dots in the fingerprint recognition region is smaller than a density of the first scattering netted dots in the backlight processing region to allow the light carrying fingerprint information to pass.

14. The electronic device according to claim 13, wherein the fingerprint recognition chip is arranged corresponding to the fingerprint recognition region, and receives the light carrying fingerprint information that passes through the fingerprint recognition region.

15. The electronic device according to claim 14, wherein at least part of the fingerprint recognition chip is located vertically below the fingerprint recognition region.

16. The electronic device according to claim 14, wherein the fingerprint recognition region is deviated from the fingerprint recognition chip, so that the fingerprint recognition chip receives the light carrying fingerprint information that passes through the fingerprint recognition region and has an incident angle greater than or equal to an incident angle threshold.

17. The electronic device according to claim 14, wherein the backlight module comprises a reflecting portion, and the reflecting portion is structured to allow the received light carrying fingerprint information within the preset wavelength range to pass, and reflects the received backlight beyond the preset wavelength range.

* * * * *